(12) United States Patent
Gao (10) Patent No.: US 9,030,600 B2
(45) Date of Patent: May 12, 2015

(54) METHOD AND APPARATUS FOR CONTROLLING FLASH

(71) Applicant: Huawei Device Co., Ltd, Shenzhen (CN)

(72) Inventor: Yunshan Gao, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 73 days.

(21) Appl. No.: 14/021,404

(22) Filed: Sep. 9, 2013

(65) Prior Publication Data

US 2014/0071338 A1 Mar. 13, 2014

(30) Foreign Application Priority Data

Sep. 10, 2012 (CN) .......................... 2012 1 0332153

(51) Int. Cl.
| | |
|---|---|
| H04N 5/222 | (2006.01) |
| H04N 5/235 | (2006.01) |
| G03B 7/16 | (2014.01) |
| H04N 5/225 | (2006.01) |
| G03B 15/02 | (2006.01) |

(52) U.S. Cl.
CPC ................ *H04N 5/2354* (2013.01); *G03B 7/16* (2013.01); *H04N 5/2256* (2013.01)

(58) Field of Classification Search
USPC ...................... 348/370–371; 396/61, 106, 173
See application file for complete search history.

(56) References Cited

U.S. PATENT DOCUMENTS

| | | | | |
|---|---|---|---|---|
| 7,577,354 | B2 * | 8/2009 | Tanaka ........................... | 396/158 |
| 7,663,691 | B2 * | 2/2010 | Ciudad et al. ................ | 348/371 |
| 8,018,525 | B2 * | 9/2011 | Trevelyan et al. ............ | 348/371 |
| 8,208,804 | B2 * | 6/2012 | Fukui ............................ | 396/168 |
| 2006/0044422 | A1 | 3/2006 | Miyazaki | |
| 2007/0047945 | A1 * | 3/2007 | Nose et al. .................... | 396/157 |
| 2008/0199171 | A1 | 8/2008 | Yoshida et al. | |
| 2009/0160944 | A1 | 6/2009 | Trevelyan et al. | |
| 2009/0206235 | A1 * | 8/2009 | Guan et al. .................... | 250/205 |

(Continued)

FOREIGN PATENT DOCUMENTS

| | | |
|---|---|---|
| CN | 1655041 A | 8/2005 |
| CN | 1744672 A | 3/2006 |

(Continued)

OTHER PUBLICATIONS

Huawei, "Compare Nikon, Canon's latest flash metering system from Development of flash metering technology," including English translation Jul. 11, 2001, 7 pages.

(Continued)

*Primary Examiner* — Ngoc-Yen Vu
(74) *Attorney, Agent, or Firm* — Slater & Matsil, L.L.P.

(57) ABSTRACT

A method and an apparatus for controlling a flash are disclosed. The method includes obtaining a statistical gray value of a preview image. If the statistical gray value of the preview image is less than a preset threshold, a corresponding fill light parameter is searched for in a preset dynamic fill light table according to the statistical gray value of the preview image and the fill light drive current is set according to the fill light parameter. The fill light drive current is configured to drive a flash lamp to fire a pre-flash. A corresponding exposure drive current in the preset exposure parameter table is configured according to the fill light parameter and the exposure drive current is configured to drive the flash lamp to flash.

16 Claims, 3 Drawing Sheets

(56) References Cited

U.S. PATENT DOCUMENTS

| | | |
|---|---|---|
| 2009/0310013 A1* | 12/2009 | Odaka .......................... 348/371 |
| 2010/0080546 A1 | 4/2010 | Lin |
| 2010/0165178 A1 | 7/2010 | Chou et al. |
| 2010/0253797 A1* | 10/2010 | Arshavski et al. ......... 348/222.1 |
| 2011/0280560 A1 | 11/2011 | Lin et al. |
| 2011/0298947 A1 | 12/2011 | Guo et al. |
| 2012/0154631 A1* | 6/2012 | Kageyama ................. 348/229.1 |
| 2012/0257091 A1* | 10/2012 | Kim .............................. 348/297 |

FOREIGN PATENT DOCUMENTS

| | | |
|---|---|---|
| CN | 101281343 A | 10/2008 |
| CN | 101516002 A | 8/2009 |
| CN | 101685194 A | 3/2010 |
| CN | 201450532 U | 5/2010 |
| CN | 102081278 A | 6/2011 |
| CN | 102566207 A | 7/2012 |
| CN | 102830573 A | 12/2012 |
| EP | 2466873 A1 | 12/2010 |
| EP | 2466873 B1 | 7/2014 |
| JP | 2001021961 A | 1/2001 |

OTHER PUBLICATIONS

Extended European Search Report received in Patent Application No. 13183668.6, mailed Nov. 21, 2013, 8 pages.

Search Report and Written Opinion received in Patent Application No. PCT/CN2013/082695, mailed Dec. 12, 2013, 13 pages.

* cited by examiner

METHOD AND APPARATUS FOR CONTROLLING FLASH

CROSS-REFERENCE TO RELATED APPLICATIONS

This application claims priority to Chinese Patent Application No. 201210332153.7, filed on Sep. 10, 2012, which is hereby incorporated by reference in its entirety.

TECHNICAL FIELD

The present invention relates to the field of digital technologies, and in particular, to a method and an apparatus for controlling a flash.

BACKGROUND

With the development of mobile phone technologies and the improvement of people's material life, people have demanding requirements on multimedia experience of a mobile phone, and a camera has become a mandatory function for a mid-to-high end mobile phone, in which the multimedia refers to that the technology enables a mobile phone user to obtain, process, edit, store, and display two or more than two different types of information media. In the photographic function of the mobile phone, to improve the photograph experience, a flash lamp function is integrated in the camera. This enables the mobile phone user to take a picture with better quality by increasing the exposure by using the flash lamp when ambient light is comparatively dim.

The work procedure of a camera's flash lamp in the prior art includes two steps: fire a pre-flash and a flash. Firing a pre-flash refers to that a dim light is sent out for a photographed person to adjust pupils to the light before the flash lamp is enabled. Then, the camera flashes to reduce influence of darkness and backlight on automatic focusing of the camera and to enable the photographed person to adjust the pupils to prevent a residual phenomenon due to the flashes entering the pupils of the photographed person when the surrounding is relatively dark, which prevents a red-eye problem.

However, during the process of controlling the flash where the prior art is used, flash intensity of the flash lamp when it flashes is fixed, which inevitably leads to a result that the picture that is taken is underexposed because the surrounding is too dark or the picture that is taken is overexposed because the surrounding is not so dark. As a result, the picture that is taken is of poor quality and unsatisfying effect.

SUMMARY

An embodiment of the present invention provides a method and an apparatus for controlling a flash, where the method and apparatus may set a fill light drive current and an exposure drive current according to different settings of statistical gray values for a preview image. This ensures the balance between a pre-flash, a flash, and ambient light and improves picture quality.

To achieve the preceding objective, embodiments of the present invention adopt the following technical solution:

In one aspect, an embodiment of the present invention provides a method for controlling the flash, where the method includes:

obtaining a statistical gray value of a preview image;

searching for a corresponding fill light parameter in a preset dynamic fill light table according to the statistical gray value of the preview image, if the statistical gray value of the preview image is less than a preset threshold;

setting a fill light drive current according to the fill light parameter;

driving a flash lamp to fire a pre-flash according to the fill light drive current;

searching for the corresponding exposure drive current in the preset exposure parameter table according to the fill light parameter; and driving the flash lamp to flash by using the exposure drive current.

According to the first aspect, in the first possible implementation manner, this method also includes:

not driving the flash lamp to flash, if the statistical gray value of the preview image is greater than or equal to the preset threshold.

In combination with the first aspect or the first possible implementation manner of the first aspect, in a second possible implementation manner, this method also includes:

the statistical gray value of the preview image uniquely corresponds to the fill light parameter and the fill light parameter uniquely corresponds to the exposure drive current.

In combination with the first aspect or the first possible implementation manner of the first aspect or the second possible implementation manner of the first aspect, in a third possible implementation manner, this method also includes:

storing a picture that is taken after the flash.

In combination with the first aspect or the first possible implementation manner to the third possible implementation manner, in a fourth possible implementation manner, this method also includes:

obtaining the statistical gray value of the preview image;

modifying the dynamic exposure table to increase the fill light drive current or the exposure drive current, if the statistical gray value of the picture is less than the first preset threshold, or, modifying the dynamic exposure table to decrease the fill drive current or the exposure drive current, if the statistical gray value of the picture is greater than the second preset threshold.

In the second aspect, an embodiment of the present invention provides an apparatus for controlling the flash, where the apparatus includes:

a physical sensor, configured to obtain a statistical gray value of the preview image; and a processor, configured to: if the statistical gray value of the preview image is less than the preset threshold, search for a corresponding fill light parameter in a preset dynamic fill light table according to the statistical gray value of the preview image, use the fill light drive current to drive a flash lamp to fire a pre-flash after setting the fill light drive current according to the fill light parameter, search for the corresponding exposure drive current in the preset exposure parameter table according to the fill light parameter, and use the exposure drive current to drive the flash lamp to flash.

According to the first aspect, in the first possible implementation manner, the processor is also configured not to drive the flash lamp to flash, if the statistical gray value of the preview image is greater than or equal to the preset threshold.

According to the first aspect or the first possible implementation manner, in the second possible implementation manner, this apparatus also includes:

a memory, configured to store the picture taken by using the flash.

In combination with the first aspect or the first possible implementation manner or the second possible implementation manner, in the third implementation manner, the processor is also configured to obtain the statistical gray value of the picture, and if the statistical gray value of the preview image is less than the first preset threshold, the processor modifies the dynamic exposure table to increase the exposure drive current, or, if the statistical gray value of the picture is greater than the second preset threshold, modify the dynamic exposure table to decrease the exposure drive current.

In the third aspect, an embodiment of the present invention provides a user terminal, including a camera and the apparatus for controlling the flash that is connected to the camera's flash lamp and has any of the forgoing characters.

The method and apparatus for controlling the flash provided by the embodiments of the present invention, by obtaining a statistical gray value of a preview image, where the statistical gray value of the preview image is obtained; if the statistical gray value of the preview image is less than the preset threshold, a corresponding fill light parameter is searched for in a preset dynamic fill light table according to the gray value of the preview image and a fill light drive current is configured according to the fill light parameter; a flash lamp is driven to fire a pre-flash by the fill light drive current; a corresponding exposure drive current is searched for in the preset exposure parameter table according to the fill light parameter, and the flash lamp is driven to flash by the exposure drive current. Through this solution, because corresponding fill light drive currents and exposure currents are configured according to different statistical gray values of preview images, the intensity of pre-flashes and flashes of the flash lamp driven by the fill light drive currents and exposure drive currents may adaptively change according to ambient light's changes, thus solving the problem of the poor quality or unsatisfied picture in the prior art due to that the picture is underexposed because the surrounding is too dark or the picture is overexposed because the surrounding is not so dark. In other words, not only the quality of a taken picture is improved, but also the photograph consumption of a user terminal is decreased, compared with the photograph consumption of the user terminal in the scenario that the picture is overexposed, thus extending the standby time of the user terminal.

BRIEF DESCRIPTION OF DRAWINGS

To illustrate the technical solutions in the embodiments of the present invention or in the prior art more clearly, the following briefly introduces the accompanying drawings needed for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Figure 1:
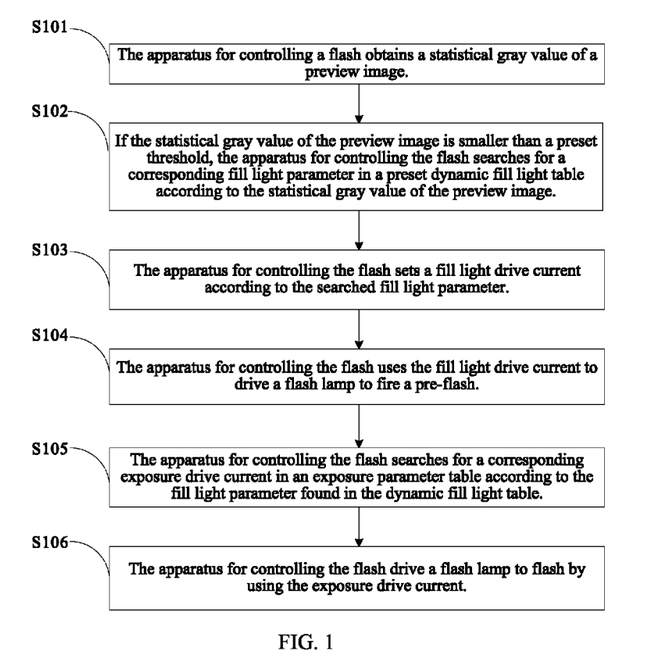
FIG. 1 is flowchart 1 of a method for controlling the flash according to an embodiment of the present invention.

The embodiment of the present invention provides a method for controlling a flash. As shown in FIG. 1, the method includes:

S101: An apparatus for controlling the flash obtains a statistical gray value of a preview image.

With the development of mobile phone technologies, the photographic function of a mobile phone has become a mandatory function for a middle and high level mobile phone. In the photographic function of a mobile phone, to improve the photograph experience, a flash lamp function is integrated in a camera. This enables a mobile phone user to take a picture with better quality by increasing the exposure by using a flash lamp when ambient light is comparatively dim.

It should be noted that, the apparatus for controlling the flash provided by the embodiment of the present invention may be installed not only in the mobile phone but also in other devices with the photographic function. The following description uses a mobile phone as an example:

When a user takes a picture, the apparatus for controlling the flash obtains the statistical gray value of the preview image according to images previewed by the camera (which are preview images); specifically, the apparatus for controlling the flash obtains the statistical gray values of the preview images by using a physical sensor installed in the apparatus for controlling the flash, in which the preview images are the images captured by the camera on the mobile phone when the user starts the photographic function of the mobile phone, and the physical sensor in the apparatus for controlling the flash may obtain the statistical gray values of the preview images from the images captured by the camera on the mobile phone, in which the physical sensor is an apparatus that converts optical signals to electrical signals by using a light-sensitive chip and the statistical gray value is a statistical value configured to indicate a brightness level; the less the statistical gray value is, the darker the image color and ambient light are, and the greater the statistical gray value is, the brighter the image color and ambient light are.

It may be understood that, an image is composed of a large number of pixels and each pixel corresponds to a gray value. The gray value is in the range of 0 to 255, in which 0 represents black and 255 represents white and different gray values reflect different color depth. The apparatus for controlling the flash obtains the statistical gray value of the preview image by calculating the average value of the statistical gray values of all the pixels that compose the preview image. The less the statistical gray value is, the darker the image color and ambient light are; the greater the statistical gray value is, the brighter the image color and ambient light are.

S102: If the statistical gray value of the preview image is less than the preset threshold, the apparatus for controlling the flash searches for the corresponding fill light parameter in the preset dynamic fill light table according to the statistical gray value of the preview image.

If the statistical gray value of the preview image is less than the preset threshold, the ambient light is comparatively dim and a fill light lamp is required for fill light, and the apparatus for controlling the flash searches for the corresponding fill light parameter in the preset dynamic fill light table according to the statistical gray value of the preview image.

Exemplarily, as shown in table 1, the preset dynamic fill light table in the embodiment of the present invention may include statistical gray values and fill light parameters, in which each of the statistical gray values correspond a unique one of the fill light parameters.

TABLE 1

| Statistical Gray value (Unit: Lux) | Fill Light Parameter |
|---|---|
| ... | ... |
| [0, 5) | 25 |
| [5, 10) | 50 |
| [10, 15) | 75 |
| [15, 20) | 100 |
| [20, 25) | 125 |
| [25, 30) | 150 |
| [30, 35) | 175 |
| ... | ... |

It may be known from table 1 that, if the statistical gray value of the preview image is 12 lux, the corresponding fill light parameter searched in the dynamic fill light table is 75, the fill light drive current configured according to the fill light parameter may be 75 mA, and the flash lamp is driven to fire a pre-flash by a 75-mA fill light drive current.

It should be noted that, different preset thresholds may be configured for different user devices. For example, the preset threshold configured for an apparatus for controlling a flash in a mobile phone may be set to 30 lux (The unit of illumination. One lux equals to the illumination of one-lumen flux over an area of one square meter), and the preset threshold configured for an apparatus for controlling the flash in a panel PC may be set to 35 lux.

S103: The apparatus for controlling the flash sets the fill light drive current according to the searched fill light parameter.

The apparatus for controlling the flash searches for the corresponding fill light parameter in the preset dynamic fill light table according to the statistical gray value of the preview image and then sets the fill light drive current according to the fill light parameter.

S104: The apparatus for controlling the flash uses the fill light drive current to drive the flash lamp to fire a pre-flash.

Then, the apparatus for controlling the flash uses the fill light drive current to drive the flash lamp to fire a pre-flash according to the configured fill light drive current.

S105: The apparatus for controlling the flash searches for the corresponding exposure drive current in the exposure parameter table according to the fill light parameter searched in the dynamic fill light table.

After the apparatus for controlling the flash fires a pre-flash, it searches for the corresponding exposure drive current in the preset exposure parameter table according to the fill light parameter searched in the dynamic fill light table.

Exemplarily, as shown in Table 2, the preset exposure parameter in this embodiment of the present invention may include fill light parameters and exposure drive currents, in which each of the fill light parameters uniquely corresponds to the exposure drive currents.

TABLE 2

| Fill Light Parameter | Exposure Drive Current (Unit: mA) |
|---|---|
| ... | ... |
| 25 | 100 |
| 50 | 200 |
| 75 | 300 |
| 100 | 400 |
| 125 | 500 |
| 150 | 600 |
| 175 | 700 |
| ... | ... |

It may be known from table 2 that, if the fill light parameter searched in the dynamic fill light table is 75, the corresponding exposure drive current searched in the exposure parameter table is 300 mA, and the flash lamp is drive to flash by a 300-mA exposure drive current.

After the apparatus for controlling the flash searches for the corresponding exposure drive current in the preset exposure parameter table, the exposure drive current may coordinate with aperture sizes, shutter time, and the exposure gain, which are the aperture-coefficient levels, shutter-coefficient levels, scene brightness levels, and exposure gain levels, to drive the flash lamp to flash, which is not limited in the present invention.

S106: The apparatus for controlling the flash drives the flash lamp to fire a flash by using the exposure drive current.

Then, the apparatus for controlling the flash drives the flash lamp to flash by using the exposure drive current according to the exposure drive current searched in the preset exposure parameter table.

The method for controlling the flash provided by the embodiment of the present invention, where the statistical gray value of the preview image is obtained; if the statistical gray value of the preview image is less than the preset threshold, the corresponding fill light parameter is searched for in the preset dynamic fill light table according to the gray value of the preview image, and the fill light drive current is configured according to the fill light parameter; the flash lamp is driven to fire a pre-flash by the fill light drive current; the corresponding exposure drive current is searched for in the preset exposure parameter table according to the fill light parameter and the flash lamp is driven to flash by the exposure drive current. Through this solution, because corresponding fill light drive currents and exposure currents are configured according to different statistical gray values of the preview images, the intensity of pre-flashes and flashes of the flash lamp driven by the fill light drive currents and exposure drive currents may adaptively change according to ambient light's changes, thus solving the problem of poor quality or an unsatisfied picture in the prior art due to that the picture is underexposed because the surrounding is too dark or the picture is overexposed because the surrounding is not so dark. In other words, not only the quality of the taken picture is improved, but also the photograph consumption of the user terminal is decreased, compared with the photograph consumption of the user terminal in the scenario that the picture is overexposed, extending the standby time of the user terminal.

Figure 2:
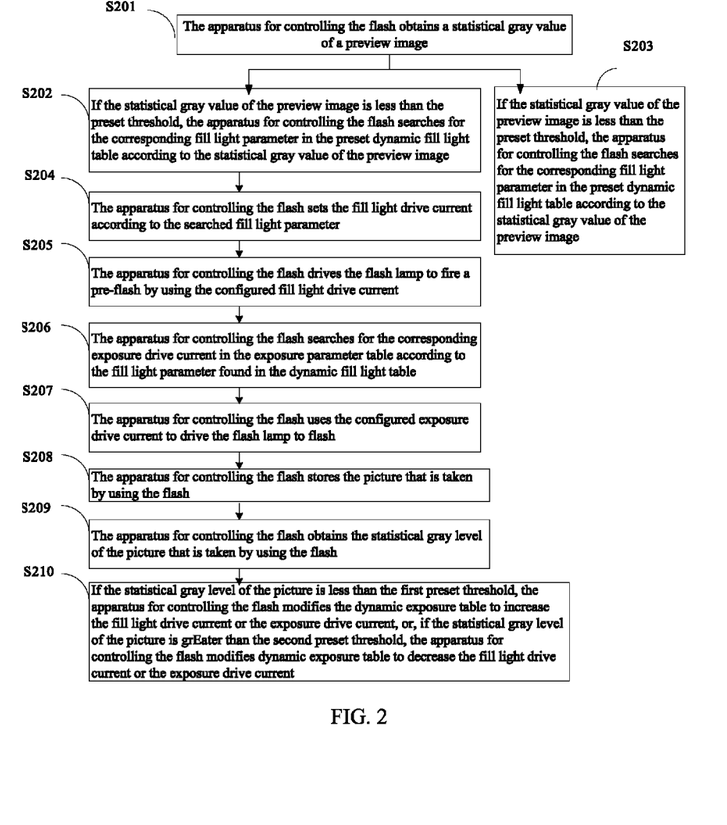
FIG. 2 is flowchart 2 of a method for controlling the flash according to an embodiment of the present invention.

The embodiment of the present invention provides a method for controlling a flash. As shown in FIG. 2, the method includes:

S201: The apparatus for controlling the flash obtains a statistical gray value of a preview image.

With the development of mobile phone technologies, the photographic function of a mobile phone has become a mandatory function for a mid-to-high end mobile phone. In the photographic function of a mobile phone, to improve photograph experience, a flash lamp function is integrated in a camera. This enables a mobile phone user to take a picture with better quality by increasing the exposure by using a flash lamp when ambient light is comparatively dim.

It should be noted that, the apparatus for controlling the flash provided by the embodiment of the present invention may be installed not only in the mobile phone but also other devices with the photographic function. The following description uses the mobile phone as an example:

When the user takes the picture, the apparatus for controlling the flash obtains, through a physical sensor, the statistical gray value of the preview image according to the image which is the preview image previewed by the camera; specifically, the apparatus for controlling the flash obtains the statistical gray values of the preview images by using the physical sensor installed in the apparatus for controlling the flash. The preview images are the images captured by the camera on the mobile phone when users start the photographic function of the mobile phone, and the physical sensor in the apparatus for controlling the flash may obtain the statistical gray values of the preview images from the images captured by the camera on the mobile phone, in which the physical sensor is an apparatus that converts optical signals to electrical signals by using a light-sensitive chip and the statistical gray value is a statistical value configured to indicate the brightness level; the less the statistical gray value is, the darker the image color and ambient light are, and the greater the statistical gray value is, the brighter the image color and ambient light are.

It may be understood that, an image is composed of a large number of pixels and each pixel corresponds to a gray value. The gray value is in the range of 0 to 255, in which 0 represents black and 255 represents white and different gray values reflect different color depth. The apparatus for controlling the flash obtains the statistical gray value of the preview image by calculating the average value of the statistical gray values of all the pixels that compose the preview image. The less the statistical gray value is, the darker the image color and ambient light are; the greater the statistical gray value is, the brighter the image color and ambient light are.

S202: If the statistical gray value of the preview image is less than the preset threshold, the apparatus for controlling the flash searches for the corresponding fill light parameter in the preset dynamic fill light table according to the statistical gray value of the preview image.

If the statistical gray value of the preview image is less than the preset threshold, the ambient light is comparatively dim and a fill light lamp is needed for fill light, and the apparatus for controlling the flash searches for the corresponding fill light parameter in the preset dynamic fill light table according to the statistical gray value of the preview image.

It should be noted that, different preset thresholds may be configured for different user devices. For example, the preset threshold configured for an apparatus for controlling the flash in a mobile phone may be set to 30 lux (The unit of illumination. One lux equals to the illumination of one-lumen flux over an area of one square meter), and the preset threshold configured for an apparatus for controlling the flash in a panel PC may be set to 35 lux.

S203: If the statistical gray value of the preview image is greater than the preset threshold, the apparatus for controlling the flash does not drive the flash lamp to flash.

A scenario parallel to step S202, in which if the statistical gray value of the preview image is greater than the preset threshold, the ambient light is relatively bright, and the flash lamp does not need to fire a pre-flash or flash, and therefore the apparatus for controlling the flash does not drive the flash lamp to flash.

S204: The apparatus for controlling the flash sets the fill light drive current according to the searched fill light parameter.

S205: The apparatus for controlling the flash drives the flash lamp to fire a pre-flash by using the configured fill light drive current.

With reference to steps S204 and S205, the following describes the process that the apparatus for controlling the flash drives the flash lamp to fire a pre-flash.

The apparatus for controlling the flash searches for the corresponding fill light parameter in the preset dynamic fill light table according to the statistical gray value of the preview image, then sets the fill light drive current according to the fill light parameter, and use the fill light drive current to drive the flash lamp to fire a pre-flash. The purpose of a pre-flash is: when the surrounding is relatively dark, to reduce the influence of darkness and backlight on the automatic focusing of the camera and enable photographed people to adjust their pupils to prevent the residual of flashes due to flashes from entering the pupils of the photographed people, which prevents a red-eye problem. For example, when a light-emitting diode (LED) is used as a flash lamp, the embodiment of the present invention may control the pre-flash quantity of the LED by setting the fill light drive current output by the current source.

It should be added that, when firing a pre-flash, the apparatus for controlling the flash may also calculate white balance, in which the white balance (White Balance) is an indicator that describes the accuracy of the white color generated after three primary colors (red, green, and blue) in the monitor mix and is configured to resolve series of issues including color rendition and half-tone processing. Because of the unique adaptability of human eyes, in different surroundings people see white objects in the same color. However, digital devices do not have this adaptability of human eyes and therefore digital devices need to imitate human brains and adjust colors according to light, that is, automatic or manual white balance adjustments is needed to achieve satisfying colors.

S206: The apparatus for controlling the flash searches for the corresponding exposure drive current in the exposure parameter table according to the fill light parameter found in the dynamic fill light table.

S207: The apparatus for controlling the flash uses the configured exposure drive current to drive the flash lamp to flash.

With reference to steps S206 and S207, the following describes the process that the apparatus for controlling the flash drives the flash lamp to flash.

Exemplarily, the apparatus for controlling the flash firstly obtains the statistical 1 gray value of the preview image obtained by the physical sensor and searches for the corresponding fill light parameter in the preset dynamic fill light table, and then searches for the corresponding exposure drive current in the preset exposure parameter table according to the corresponding fill light parameter found in the dynamic fill light table, and then drives the flash lamp to flash according to the exposure drive current. The fill light parameter uniquely corresponds to the exposure drive current, and similarly, when an LED is used as the flash lamp, the embodiment of the present invention may control the flash quantity of the LED by using the exposure drive current corresponding to the fill light parameter.

Exemplarily, as shown in table 3, the dynamic fill light table is combined with the exposure parameter table, in which the statistical gray value uniquely corresponds to the fill light parameter and the fill light parameter uniquely corresponds to the exposure drive current.

TABLE 3

| Statistical Gray value (Unit: Lux) | Fill Light Parameter | Exposure Drive Current (Unit: mA) |
|---|---|---|
| ... | ... | ... |
| [0, 5) | 25 | 100 |
| [5, 10) | 50 | 200 |
| [10, 15) | 75 | 300 |
| [15, 20) | 100 | 400 |
| [20, 25) | 125 | 500 |
| [25, 30) | 150 | 600 |
| [30, 25) | 175 | 700 |
| ... | ... | ... |

It may be known from table 3 that, if the statistical gray value of the preview image is 12 lux, the corresponding fill light parameter found in Table 3 is 75, the fill light drive current configured according to the fill light parameter may be 75 mA, and the flash lamp is driven to fire a pre-flash by a 75-mA fill light drive current. Then, the corresponding exposure drive current that is found is 300 mA, and the flash lamp is driven to flash by a 300-mA exposure drive flash.

It should be added that, after the apparatus for controlling the flash searches for the corresponding exposure drive current in the preset exposure parameter table, the exposure drive current coordinates with aperture sizes, shutter time, and the exposure gain, which are the aperture-coefficient levels, shutter-coefficient levels, scene brightness levels, and exposure gain levels, to drive the flash lamp to flash.

S208: The apparatus for controlling the flash stores the picture that is taken by using the flash.

S209: The apparatus for controlling the flash obtains the statistical gray level of the picture that is taken by using the flash.

S210: If the statistical gray level of the picture is less than the first preset threshold, the apparatus for controlling the flash modifies the dynamic exposure table to increase the fill light drive current or the exposure drive current, or, if the statistical gray level of the picture is greater than the second preset threshold, the apparatus for controlling the flash modifies dynamic exposure table to decrease the fill light drive current or the exposure drive current.

With reference to steps S208, S209, and S210, the following description illustrates how a mobile phone modifies the dynamic fill light table.

In the prior art, a camera flashes usually in auto-flash mode. In this case, the camera automatically determines whether light in the scene where a picture is taken is sufficient. If the light is insufficient, the flash lamp is automatically started to flash for light compensation.

However, in the embodiment of the present invention, the apparatus for controlling the flash first stores a picture that is taken after driving the flash lamp to flash by using the exposure drive current, and then obtains the statistical gray value of the picture according to the picture that is taken by using the flash and compares the statistical gray value of the picture with the first preset threshold and the second preset threshold, where the first preset threshold is a marginal value for identifying whether the picture is underexposed and the second preset threshold is a marginal value for identifying whether the picture is overexposed. If the statistical gray value of the picture is less than the first preset threshold or greater than the second preset threshold, the apparatus for controlling the flash modifies the dynamic fill light table. Otherwise, photographing is stopped, in which if the dynamic fill light table needs to be modified, it indicates that the picture is overexposed or underexposed, which indicates that the statistical gray level of the preview image and the corresponding fill light parameter need to be adjusted. If the picture is overexposed, it indicates that the flash is too strong, and the exposure drive current corresponding to the dynamic fill light table need to be decreased; if the picture is overexposed, it indicates that the flash is too weak, and the exposure drive current corresponding to the dynamic fill light table needs to be increased. Therefore, the scheme for controlling the flash may be consistently adjusted and modified by modifying the dynamic fill light table.

The method for controlling the flash provided by the embodiment of the present invention, where the statistical gray value of the preview image is obtained; if the statistical gray value of the preview image is less than the preset threshold, the corresponding fill light parameter is searched for in the preset dynamic fill light table according to the gray value of the preview image, and the fill light drive current is configured according to the fill light parameter; the flash lamp is driven to fire a pre-flash by the fill light drive current; the corresponding exposure drive current is searched for in the preset exposure parameter table according to the fill light parameter and the flash lamp is driven to flash by the exposure drive current. The picture taken by using the flash is analyzed; if the statistical gray value of the picture that is taken by using the flash is less than the first preset threshold or greater than the second preset threshold, the dynamic fill light table is modified. Through this solution, because corresponding fill light drive currents and exposure currents are configured according to different statistical gray values of the preview images, the intensity of pre-flashes and flashes of the flash lamp driven by the fill light drive currents and exposure drive currents may adaptively change according to ambient light's changes, thus solving the problem of the poor quality or unsatisfied picture in the prior art due to that the picture is underexposed because the surrounding is too dark or the picture is overexposed because the surrounding is not so dark. In other words, not only the quality of the taken picture is improved, but also the photograph consumption of the user terminal is decreased, compared with the photograph consumption of the user terminal in the scenario that the picture is overexposed, extending the standby time of the user terminal.

Figure 3:
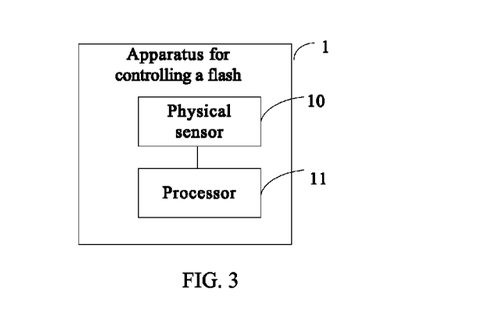
FIG. 3 is structural schematic diagram 1 of an apparatus for controlling the flash according to an embodiment of the present invention.

A type of apparatus 1 for controlling the flash provided in the embodiment of the present invention is corresponding to the foregoing solution embodiment, and each functional unit of the apparatus 1 for controlling the flash may be used in the steps of the foregoing method. As shown in FIG. 3, apparatus 1 for controlling the flash includes:

a physical sensor 10, configured to obtain the statistical gray value of the preview image;

a processor 11, configured to: if the statistical gray value of the preview image is less than the preset threshold, search for the corresponding fill light parameter in the preset dynamic fill light table according to the statistical gray value of the preview image, use the fill light drive current to drive the flash lamp to fire a pre-flash after setting the fill light drive current according to the fill light parameter, search for the corresponding exposure drive current in the preset exposure parameter table according to the fill light parameter, and use the exposure drive current to drive the flash lamp to flash.

Furthermore, a processor 11 is also configured not to drive the flash lamp to flash if the statistical gray value of the preview image is equal to or less than the preset threshold.

Furthermore, the statistical gray value of the preview image uniquely corresponds to the fill light parameter and the fill light parameter uniquely corresponds to the exposure drive current.

Figure 4:
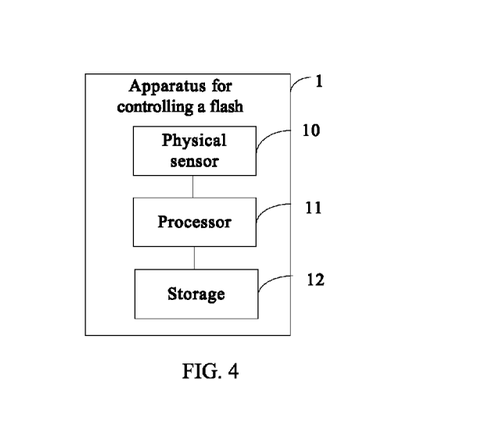
FIG. 4 is structural schematic diagram 2 of an apparatus for controlling the flash according to an embodiment of the present invention.

Furthermore, as shown in FIG. 4, an apparatus 1 for controlling the flash further includes:

a memory 12, configured to store the picture that is taken by using the flash.

Furthermore, the processor 11 is also configured to obtain the statistical gray value of the picture, and if the statistical gray value of the picture is less than the first preset threshold, modify the dynamic exposure table to increase the exposure drive current, or, modify the dynamic exposure table to decrease the exposure drive current if the statistical gray value of the picture is greater than the second preset threshold.

It should be added that, the apparatus for controlling the flash may be integrated in software, and is presented to users as a software menu interface in the photograph system of a mobile phone. Users may manually select and modify each fill light and exposure parameters based on their own requirements to meet user demands on light.

The apparatus for controlling the flash provided by the embodiment of the present invention, where the statistical gray value of the preview image is obtained; if the statistical gray value of the preview image is less than the preset threshold, the corresponding fill light parameter is searched for in the preset dynamic fill light table according to the gray value of the preview image, and the fill light drive current is configured according to the fill light parameter; the flash lamp is driven to fire a pre-flash by the fill light drive current; the corresponding exposure drive current is searched for in the preset exposure parameter table according to the fill light parameter and the flash lamp is driven to flash by the exposure drive current; The picture taken by using the flash is analyzed; if the statistical gray value of the picture that is taken by using the flash is less than the first preset threshold or greater than the second preset threshold, the dynamic fill light table is modified. Through this solution, because corresponded fill light drive currents and exposure currents are configured according to different statistical gray values of the preview images, the intensity of pre-flashes and flashes of the flash lamp driven by the fill light drive currents and exposure drive currents may adaptively change according to ambient light's changes, thus solving the problem of the poor quality or unsatisfied picture in the prior art due to that the picture is underexposed because the surrounding is too dark or the picture is overexposed because the surrounding is not so dark. In other words, not only the quality of the taken picture is improved, but also the photograph consumption of the user terminal is decreased, compared with the photograph consumption of the user terminal in the scenario that the picture is overexposed, extending the standby time of the user terminal.

The embodiment of the present invention also provides a type of user terminal, including the camera and the apparatus for controlling the flash that is connected to the camera's flash lamp and has any of the forgoing characters.

It should be noted that, the embodiment of the present invention uses a mobile phone as an example to illustrate when the apparatus for controlling the flash is installed in a mobile phone, the balance between pre-flashes, flashes, and ambient light is ensured and the picture quality is improved. However, the apparatus for controlling the flash may be installed not only in mobile phones but also other devices with a photographic function, such as a panel PC and so on, and decrease the photograph consumption of the user terminal when ensuring the balance between flashes and ambient light, extending the standby time of the user terminal, which is not limited in the present invention.

The apparatus for controlling the flash provided by the embodiment of the present invention, including cameras and apparatus for controlling the flash that is connected to the camera's flash lamp and has any of the forgoing characters, where the statistical gray value of the preview image is obtained through the apparatus for controlling the flash; if the statistical gray value of the preview image is less than the preset threshold, the corresponding fill light parameter is searched for in the preset dynamic fill light table according to the gray value of the preview image, and the fill light drive current is configured according to the fill light parameter; the flash lamp is driven to fire a pre-flash by the fill light drive current; the corresponding exposure drive current is searched for in the preset exposure parameter table according to the fill light parameter and the flash lamp is driven to flash by the exposure drive current. The picture taken by using a flash is analyzed; if the statistical gray value of the picture that is taken by using the flash is less than the first preset threshold or greater than the second preset threshold, the dynamic fill light table is modified. Through this solution, because corresponded fill light drive currents and exposure currents are configured according to different statistical gray values of the preview images, the intensity of pre-flashes and flashes of the flash lamp driven by the fill light drive currents and exposure drive currents may adaptively change according to ambient light's changes, thus solving the problem of the poor quality or unsatisfied picture in the prior art due to that the picture is underexposed because the surrounding is too dark or the picture is overexposed because the surrounding is not so dark. In other words, not only the quality of the taken picture is improved, but also the photograph consumption of the user terminal is decreased, compared with the photograph consumption of the user terminal in the scenario that the picture is overexposed, extending the standby time of the user terminal.

A person of ordinary skill in the art may understand that, all or a part of the steps of the methods in the embodiments may be implemented by a program instructing relevant hardware. The foregoing program may be stored in a computer readable memory medium. When the program runs, the preceding steps included in the method embodiments are performed; the foregoing memory medium may be any medium capable of storing program codes, such as a ROM, a RAM, a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for controlling a flash, the method comprising:
obtaining a statistical gray value of a preview image; and
when the statistical gray value of the preview image is less than a preset threshold,
searching for a corresponding fill light parameter in a preset dynamic fill light table according to the statistical gray value of the preview image;
setting a fill light drive current according to the fill light parameter;
driving a flash lamp to fire a pre-flash by using the fill light drive current;
searching for a corresponding exposure drive current in an exposure parameter table by using the fill light parameter; and driving the flash lamp to flash by using the exposure drive current.

2. The method for controlling the flash according to claim 1, further comprising not driving the flash lamp to flash when the statistical gray value of the preview image is greater than or equal to the preset threshold.

3. The method for controlling the flash according to claim 1, wherein the statistical gray value of the preview image uniquely corresponds to the fill light parameter and the fill light parameter uniquely corresponds to the exposure drive current.

4. The method for controlling the flash according to claim 1, wherein, after driving the flash lamp to flash, the method further comprises storing a picture taken by using the flash.

5. The method for controlling the flash according to claim 4, wherein, after storing the picture taken by using the flash, the method further comprises obtaining the statistical gray value of the picture.

6. The method for controlling the flash according to claim 4, further comprising:
   modifying the exposure parameter table to increase the fill light drive current or the exposure drive current if the statistical gray value of the picture is less than a first preset threshold; and
   modifying the exposure parameter table to decrease the fill light drive current or the exposure drive current, if the statistical gray value of the picture is greater than a second preset threshold.

7. The method for controlling the flash according to claim 4, wherein the statistical gray value of the picture is less than a first preset threshold, the method further comprising modifying the exposure parameter table to increase the fill light drive current or the exposure drive current.

8. The method for controlling the flash according to claim 4, wherein the statistical gray value of the picture is greater than a second preset threshold, the method further comprising modifying the exposure parameter table to decrease the fill light drive current or the exposure drive current.

9. An apparatus for controlling a flash, comprising:
   a physical sensor, configured to obtain a statistical gray value of a preview image; and
   a processor, configured, when the statistical gray value of the preview image is less than a preset threshold, to search for a corresponding fill light parameter in a preset dynamic fill light table according to the statistical gray value of the preview image, to use a fill light drive current to drive a flash lamp to fire a pre-flash after setting the fill light drive current according to the fill light parameter, to search for a corresponding exposure drive current in an exposure parameter table according to the fill light parameter, and to use the exposure drive current to drive the flash lamp to flash.

10. The apparatus for controlling the flash according to claim 9, wherein the processor is configured not to drive the flash lamp to flash when the statistical gray value of the preview image is greater than or equal to the preset threshold.

11. The apparatus for controlling the flash according to claim 9, further comprising a memory, configured to store a picture that is taken after the flash.

12. The apparatus for controlling the flash according to claim 11, wherein the processor is further configured to obtain the statistical gray value of the picture and, when the statistical gray value of the picture is less than a first preset threshold, to modify the exposure table to increase the exposure drive current and, when the statistical gray value of the picture is greater than a second preset threshold, to modify the exposure table to decrease the exposure drive current.

13. A user terminal, comprising:
   a camera;
   a flash lamp, configured to operate with the camera;
   a physical sensor, configured to obtain a statistical gray value of a preview image; and
   a processor, configured, when the statistical gray value of the preview image is less than a preset threshold, to search for a corresponding fill light parameter in a preset dynamic fill light table according to the statistical gray value of the preview image, to use a fill light drive current to drive the flash lamp to fire a pre-flash after setting the fill light drive current according to the fill light parameter, to search for a corresponding exposure drive current in an exposure parameter table according to the fill light parameter, and to use the exposure drive current to drive the flash lamp to flash.

14. The user terminal according to claim 13, wherein the processor is configured not to drive the flash lamp to flash when the statistical gray value of the preview image is not less than the preset threshold.

15. The user terminal according to claim 13, further comprising a memory, configured to store a picture that is taken after the flash.

16. The user terminal according to claim 15, wherein the processor is further configured to obtain the statistical gray value of the picture and, when the statistical gray value of the picture is less than a first preset threshold, to modify the exposure table to increase the exposure drive current, and, when the statistical gray value of the picture is greater than a second preset threshold, to modify the exposure table to decrease the exposure drive current.

* * * * *